United States Patent Office 3,462,918
Patented Aug. 26, 1969

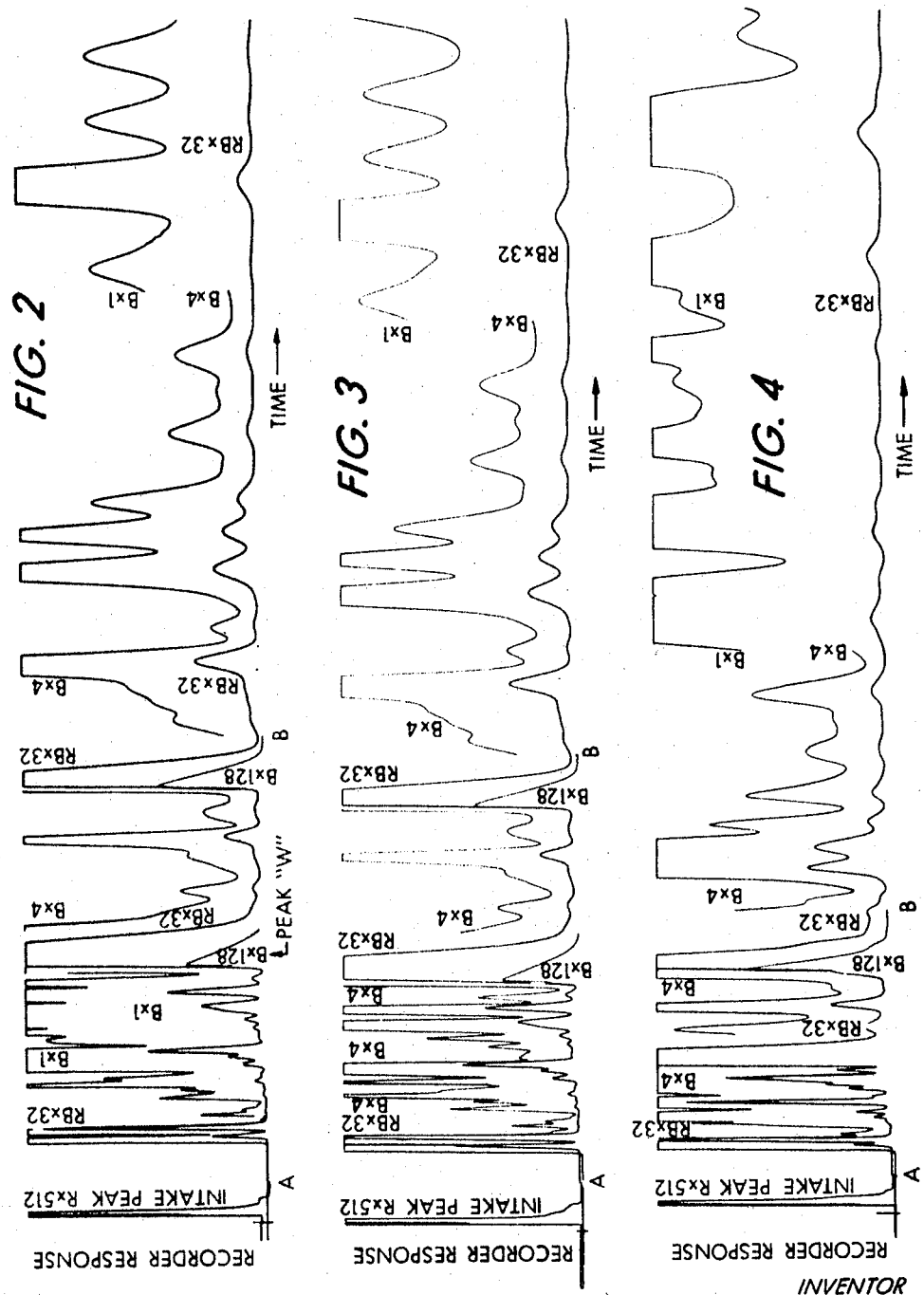

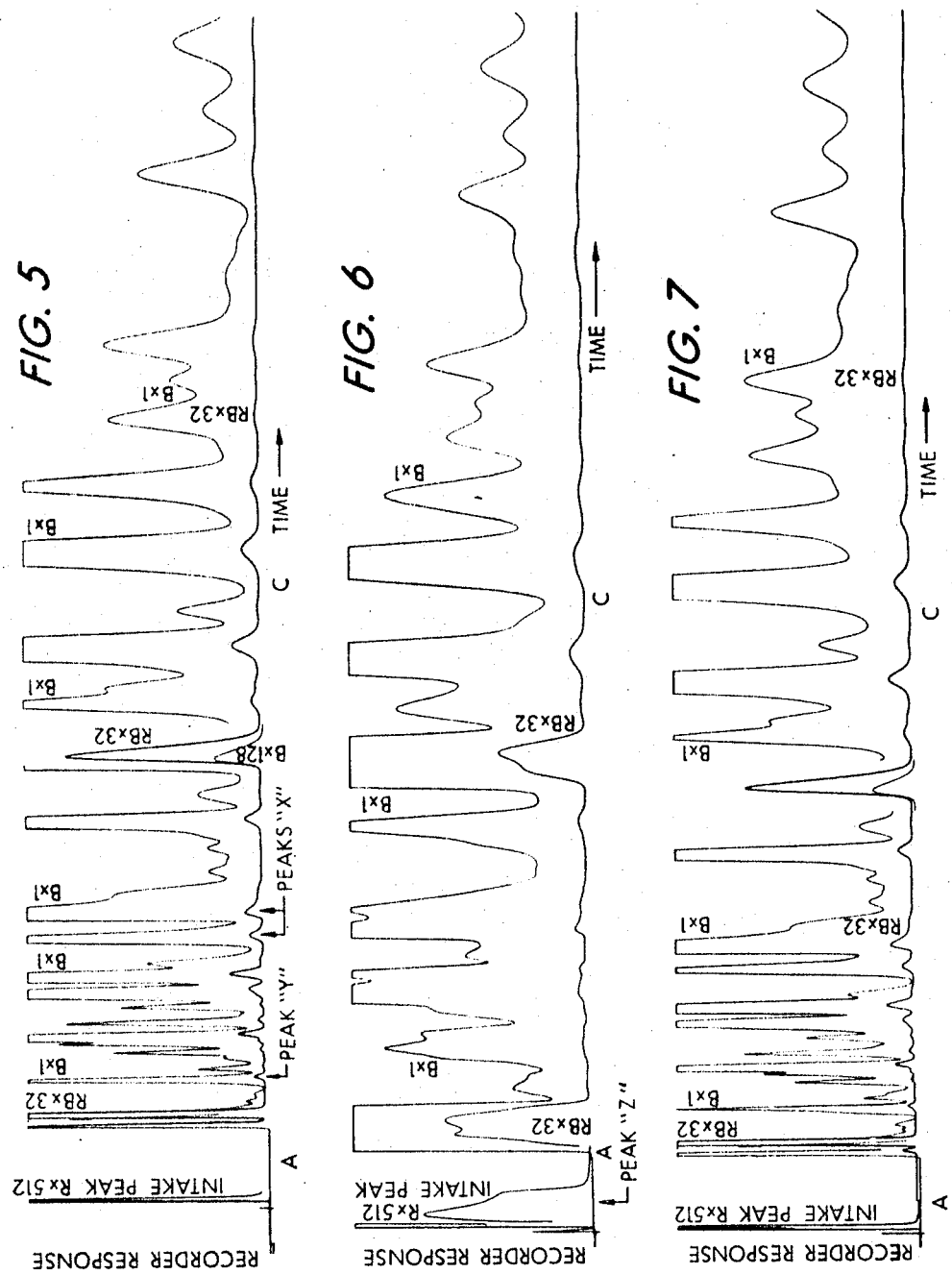

3,462,918
CHROMATOGRAPHIC METHOD AND APPARATUS
Robert A. Prosser, 15 Maine Ave.,
Natick, Mass. 01760
Filed July 31, 1967, Ser. No. 657,343
Int. Cl. B01d 15/08
U.S. Cl. 55—67
32 Claims

ABSTRACT OF THE DISCLOSURE

An apparatus and method which utilize a pulsating stream of carrier gas provide means for collecting volatile materials in concentrated form and separating them from contaminants. The volatile materials can thus be subjected to the gas-liquid chromatograph and, if desired, recovered with negligible loss or contamination. A reasonable approximation of "plug" flow into the chromatograph is obtained even when the sample is extremely small.

---

Figure 1:
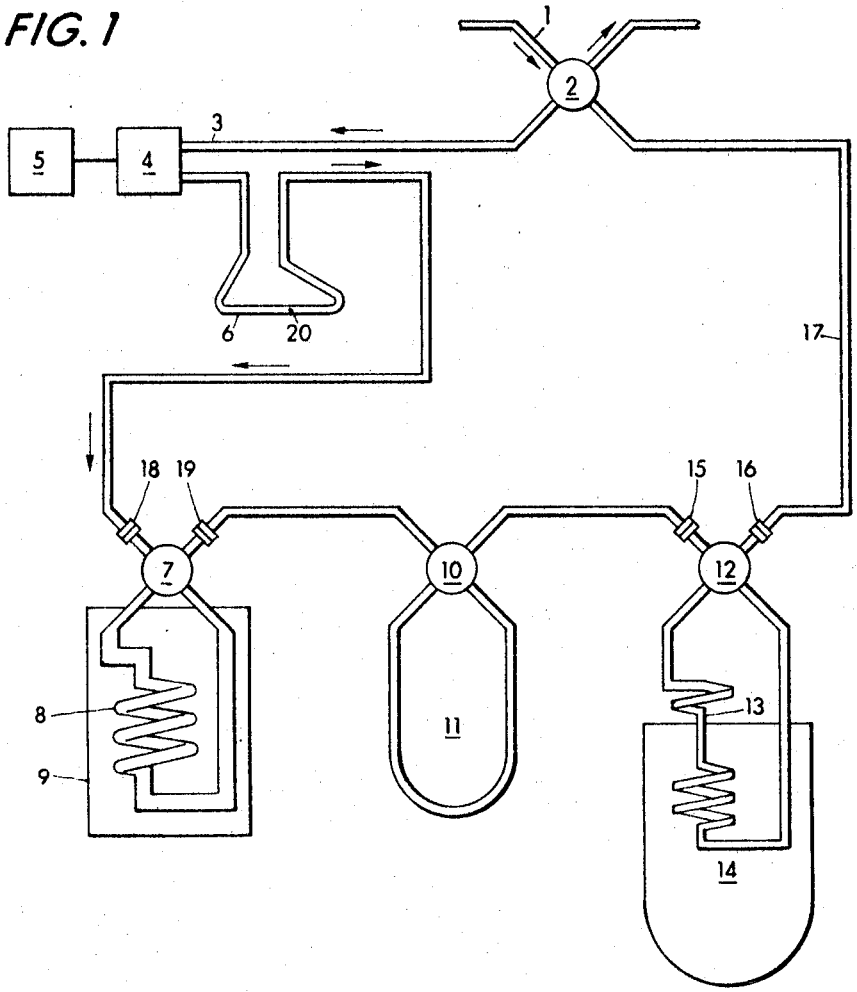

The Government has a non-exclusive, irrevocable, royalty-free license in the invention described herein, with power to grant sublicenses for all governmental purposes.

The use of hot-filament reaction-vessel pyrolysis unit-in-line with a gas-liquid chromatograph (GLC) has been recently employed to study the degradation of many polymers. The combination offers three important advantages: (1) pyrolysis products are quickly removed from the pyrolysis chamber by the carrier gas, thereby reducing the risk of further decomposition; (2) there are no transfer losses between the pyrolysis unit and the GLC; and (3) "plug" flow results, that is, the pyrolysis products enter the GLC column in the concentrated state required for good peak resolution.

The pyrolysis parameters are, however, severely restricted by the operating conditions of the GLC, and consequently it is desirable to separate the pyrolysis unit from the GLC and still retain the benefits. In most cases where peak identification by infrared and mass spectra is uncertain, pyrolysis must be carried out separately. This is especially true when relatively large quantities of material have to be decomposed in order to provide enough of the degradation products for identification by nuclear magnetic resonance (NMR), elemental analysis, boiling point, etc. because they are difficult to pyrolyze quickly enough for "plug" flow to result. Also, the GLC column can be obstructed by pyrolyzate which is not volatile at the temperature of the column. In addition, by-products such as hydrogen fluoride, hydrogen chloride, or water may mask many peaks of the chromatogram, and they can adversely affect the equipment.

When pyrolysis is carried out separately, the first advantage can be retained, i.e., the pyrolysis unit can still be swept by helium. Separately operated, the pyrolysis can be carried out (1) over a wider range of pressures, including vacuum conditions; (2) over a wider range of inert gas flow rates; (3) over a period of time (if the decomposition is slow at the given temperature) and hence over a broader range of temperature; (4) using much larger sample sizes; and (5) in the presence of additives, e.g., hydrogen, oxygen, sulfur dioxide, etc. Furthermore, materials such as hydrogen fluoride and water can be removed from the sample prior to chromatographing.

It is difficult to retain the second and third advantages when dealing simultaneously with gases and volatile liquids. The usual technique has been to use a hypodermic syringe but this entails loss of material and generally makes "plug" flow impossible.

There are two other disadvantages inherent in the syringe technique; one involves time and the other the sampling temperature. If the major peaks require an hour to issue from the GLC and if quantities of each peak are to be collected, multiple chromatograms may have to be made. If the entire gaseous pyrolyzate can be introduced into the GLC at one time in a concentrated state, much time can be saved, the peak resolution is improved, and peaks may appear that were not detected when the syringe was used.

As for the temperature disadvantage, the best way to obtain a chromatogram showing the correct relative peak areas of the pyrolysis products is to introduce the entire undiluted solid, liquid, and gaseous pyrolyzate, or an aliquot thereof into a GLC that can be programmed to a temperature high enough so that all the major pyrolysis products are eluted. But sampling is relatively inconvenient when the syringe and pyrolyzate are at an elevated temperature. However, if the pyrolyzate is divided by removing the gases and other materials that are readily volatile at about 120° C., the rest can be handled by routine methods at room temperature with negligible losses by evaporation. This leads to an equivalent result by means of two "overlapping" chromatograms. In cases where a major pyrolysis product condenses at room temperature, a chromatogram of a sample of the gaseous phase will not give a true picture of the relative amount of the material. Even when the sample is taken at an elevated temperature, the same criticism holds although a truer picture is obtained of the relative amounts of the lower molecular weight materials.

Further, when the pyrolysis is carried out in a closed vessel, secondary degradation can occur, the relative amounts of the degradation products may be severely affected, and the mechanism of decomposition can be obscured. Of course, as was noted earlier secondary degradation can be reduced by sweeping the pyrolysis products as they are formed into a trap with helium. It would be desirable to keep this trap small enough so that, on attachment to the GLC, it would provide "plug" flow and thus eliminate the syringe; on the other hand, the trap should be long enough to collect all of the pyrolysis products at a reasonable sweep rate of the helium. In order to keep the surface-to-volume ratio of the trap sufficiently large to condense the pyrolyzate quickly, narrow-bore tubing should be used, but, unfortunately, such tubing is prone to clogging. Therefore, it would be better to construct the trap to serve its main function, i.e., the collection of the pyrolyzate without becoming blocked.

The present invention provides an apparatus and method by means of which pyrolyzates, in the gaseous state at an elevated temperature, can be transferred to the GLC with negligible loss or contamination and at the same time provide the benefits of "plug" flow. The objects of the invention and many of the advantages associated therewith will be readily appreciated by reference to the accompanying drawings in which FIG. 1 is a diagrammatic showing of one modification of the present invention. FIGS. 2–7 are chromatograms of results obtained from the working examples.

Referring to FIG. 1, the apparatus comprises inlet tube 1, valve 2, flow tube 3, bellows and check valves 4, bellows pump motor 5, flow indicator 6 containing ball 20, valve 7, collection trap 8, oven 9, valve 10, reaction vessel 11, valve 12, concentration trap 13, cooling chamber 14, connections 15, 16, 18 and 19; and outlet tube 17.

In one embodiment of the invention valves 2, 7, 10 and 12 are made from stainless steel and Teflon and have a maximum permissible temperature of 150° C. Collection trap 8 was made from 0.250-inch O.D., 0.030-inch wall copper tubing. Concentration trap 13 was made from 0.125-inch O.D., 0.030-inch wall copper or stainless steel tubing or from 3 mm. O.D. glass tubing. The flow indicator 6 was 3 mm. O.D. glass tubing and contained a 1/16" diameter, stainless steel ball 20. The straight section of the indicator was tilted so that the ball tends to run in the opposite direction to flow of carrier gas. Constrictions are placed near the ends of the straight section to prevent escape of the ball.

Pump 4 in this embodiment had low volume chamber, stainless steel bellows and monel check valves. It can be operated at 150° C. No oil or grease was used in the pump or elsewhere in the system, and the pump was designed to provide an abrupt, pulsating, "spurting" flow. Apparatus meeting these requirements are obtainable in the market; for example, the Micro-Bellows Pump, made by Research Appliance Corporation is suitable.

In using the apparatus the volatile sample is carried in a stream of inert gas from a source such as a pyrolysis oven into collection trap 8 through valve 7. Valve 7 is closed and the trap and valve disconnected from the oven system. Valve 7 and trap 8 are then aligned as shown in FIG. 1 at connections 18 and 19 with most of trap 8 immersed in oven 9. Inert gas, such as helium, is then delivered through inlet tube 1, valve 2 and flow tube 3 to bellows 4, where the flow is transformed to the desired pulsating nature, cleaning out the pump and also the connecting tubing. A heat gun can be used in the cleaning process. Valve 2 is turned to by-pass, collection trap 13 is put into liquid nitrogen, and valves 7 and 12 are turned to "through." As the pulsating gas flow passes through flow indicator 6, ball 20 provides a means for determining the relative speed of the gas flow. If the gas flow ceases, ball 20 will come to rest at the left side of the straight portion of flow indicator 6.

The pulsating stream of inert gas passes through valve 7 into collection trap 8 and forces the revolatized sample from trap 8 through valve 7 and into reaction vessel 11 through valve 10 or directly into concentration trap 13 through valve 12. If needed, heat can be applied to volatize the material in trap 8 by means of oven 9. Heat can be applied to the connecting tubing to drive over any material in the tubing.

Reaction vessel 11 can be made of glass or metal tubing depending upon the nature of the samples to be employed. It may contain a reagent such as calcium chloride, concentrated sulfuric acid, molecular sieve pellets, or a catalyst such as platinum or palladium used in hydrogenation. Hydrogen or other reactive gases or vapors can be used in place of the inert gas. The connections are preferably made with Swagelok fittings (not shown) using Viton-A, Fluorel, or silicone O-rings in places of Swagelok ferrules.

The spurting flow of material into concentration trap 13 prevents the trap from becoming blocked. In general, cooling chamber 14 will contain means for cooling the trap contents rapidly, for example, liquid nitrogen. If the carrier gas and sample enter concentration trap 13 in a steady stream, there is a strong tendency for the sample to condense quickly at the point where the tubing meets the coolant. As a result, the tubing is quickly blocked at that point, particularly if the sample is comparatively large and/or the tubing comparatively narrow. In contrast when the pulsating stream of the present invention is employed, the sample tends to condense over the inside of the trap beneath the cooling material in an even snow-like deposit. This permits all of the sample to be trapped and available for further use. When the volume of the sample is reasonably predictable, the volume of concentration trap 13 can be selected to handle just that volume. Trap 13 is preferably elongated, e.g., tube-shaped, rather than spherical. Should any of the sample traverse through concentration trap 13, it will not be lost but will be condensed at a later time since this is a recirculating system. When substantially all of the sample is in collection trap 13, valve 7 is closed, valve 2 is opened and the helium removed from connecting tubing and concentration trap 13 with a vacuum pump. Valve 12 is then closed leaving the sample in trap 13 essentially free of carrier gas and in a small volume relative to the condensed volume of the sample. Valve 7 can be left open during the evacuation of carrier gas, and any residual material will be brought over from trap 8 into trap 13. In this event the rate of the evacuation should be slow enough to allow the residual material to condense in trap 13.

Valve 12 is then closed to prevent escape of the trapped sample and concentration trap 13 including valve 12 is then disconnected from the system at connections 15 and 16. The concentration trap is then hooked into a gas line designed to feed the sample to a gas liquid chromatograph in a standard manner which automatically flushes the connecting lines of air. By adjusting valve 12, helium gas can be passed through the trap forcing the sample out through valve 12 and into the chromatograph with a minimum of mixing between carrier gas and sample. In general the application of some heat to trap 13 is desirable in order to volatilize the trapped sample. This can be accomplished by various means obvious to those skilled in the art, such as immersing the trap into an oven.

A typical gas liquid chromatograph useful with the present invention is a dual column instrument which is generally known in the art as an analytical gas-liquid chromatograph, and preferably one that uses a non-destructive sensing element such as a thermal conductivity cell.

If trap 13 becomes blocked because large amounts of material condense at room temperature, the block may be relieved by one or all of the following changes:

(a) Two concentration traps can be placed in series, using coolants at different temperatures, or a series of coolants at increasingly lower temperatures can be used with one trap.

(b) A loop of concentration trap 13 can be placed above the level of the liquid nitrogen, as shown in FIG. 2, preferably in the vertical plane. Readily condensible material will collect in the loop and will not be able to run into that portion of the trap that is cooled by contact with liquid nitrogen.

(c) Trap 8 can be placed in unheated oven 9 in the frozen state. The period of time for raising the temperature of oven 9 to 120° C. can be increased.

(d) A pump meeting the above requirements but providing an even more abrupt pumping stroke can be used.

(e) If the charge is a mixture, its size can be reduced by removing components as indicated by chromatogram peaks. Using the procedure described, herein in Example 1, make a chromatogram of the material that has blocked concentration trap 12, and catch the eluent from the GLC in collection trap 8. Decide which peak or peaks of the chromatogram are to be abstracted to alleviate the blocking. Transfer the material from collection trap 8 to concentration trap 13 using the concentrator as described under Example 1, and start a second chromatogram. Place two collection traps in series at the exit port of the GLC; leave the second open all the time, and open and close the first to remove the desired peak or peaks as planned.

Raising or lowering trap 13 in the liquid nitrogen coolant may also remove blocks without opening the system. The use of 0.125-inch O.D. stainless steel tubing instead of 0.125-inch O.D. copper tubing for concentration trap 13 also provides more trouble-free operation.

If the sample consists of relatively large amounts of material that condense at room temperature and if the apparatus of this invention is used at room temperature, there may be serious losses in copper tubing due to condensation. This can be avoided by operating the apparatus except for concentration trap 13, cooling chamber 14, and motor 5 at an elevated temperature.

The presence of a leak in an apparatus of this invention can be detected by means of a manometer which is attached at valve 2. The system, except for the bellows pump motor, is then placed under 50 p.s.i.g. of helium or other inert gas and temporarily submerged in water. After all leaks are repaired, the system again except for the bellows pump motor, is then placed in an oven at 140°

C. with valve 2 connected to a valve attached to a GLC. Helium is allowed to flow from the GLC through the apparatus of the invention while additional heat is applied with a heat gun to all parts of the system except those containing Teflon. The heat gun is then removed and base line of the recorder is allowed to stabilize. By comparing the base line of the recorder when valve 2 is on "through" with its position when valve 2 is on "bypass," one can determine when the system is clean enough for use or, by judicious use of the valves, which part of the system needs further cleaning. As mentioned earlier, the apparatus of the invention, with minor adaptations, can be operated while in an oven. This has the advantage that contamination checks can be easily made after each use.

Since transfer time from collection trap 8 to concentration trap 13 is initially unknown, it is best to allow this transfer to take place overnight. Subsequent transfers can be done in a few hours and chromatograms compared. Even if the latter chromatogram indicates some material has been lost, it is probably still in collection trap 8. For this reason the same collection and concentration traps should be used with a given sample.

Two procedures for reducing the time element for transferring the sample from collection trap 8 to concentration trap 13 are:

A. If it has been found that when concentration trap 13 is in liquid nitrogen and a vacuum is applied briefly to remove helium the loss of material from the trap 13 is negligible, and if one is willing to risk the loss of the low-boiling material, or if the low-boiling material has been caught in another trap, the charge can be transferred from the trap 8 to the trap 13 quickly by using the apparatus in a manner similar to that of a vacuum rack. The transfer can thus be accomplished in about one hour with a low loss of material as determined by comparing chromatograms before and after using this procedure.

B. The inert gas supply can be used to push the contents of the trap 8 to the trap 13. However, the valve 2 must be modified so that when the handle is midway between the "bypass" and "through" positions, helium can enter the apparatus but nothing can leave. One must be quite careful with this procedure. It is quite easy to inadvertantly sweep the entire charge up the hood. It was found that, even when the helium flow rate is quite low, if the helium is not stopped at valve 2 but instead valve 2 is placed on the "through" position, a considerable amount of the charge does not condense in concentration trap 13 but is swept through and up the hood. The remaining material keeps blocking trap 13 probably because it keeps condensing in a small area. These blocks may be removed as discussed earlier.

This third procedure can also be accomplished in an hour or less and with low losses. Also, it can be used immediately after and in conjunction with the vacuum rack procedure to diminish the loss of material there.

In all the above procedures the flow of the charge through apparatus of this invention, whether caused by the helium in the apparatus itself or in the GLC by application of a vacuum or the bellows pump, is always in one direction, i.e., each trap or component has a definite entry and exit port.

Example 1

The concentrator was first used to determine whether or not a given chromatogram is reproducible. The following steps were carried out:

(a) Trap 8 was used to collect the pyrolyzate of plasticizer-free polyvinylidene fluoride. It was then disconnected from the pyrolysis oven and placed in position as shown in FIG. 1, without reaction vessel 11.

(b) Valve 2 was turned to "through" and the connecting tubing was heated with the heat gun and flushed out with pure helium with the pump turned on.

(c) Valve 2 was turned to "bypass" and valves 12 and 7 in that order to "through." The temperature of trap 8 in oven 9 was slowly raised to 120° C. and the pyrolyzate pumped to the trap 13 over a period of from two to three hours.

(d) Valve 7 was turned to "bypass." The Dewar was raised and liquid nitrogen was added until all the loops of trap 13 were covered.

(e) The helium was removed from the trap 13, connecting tubing, and pump bellows 4, using valves 12 and 2 and a mechanical vacuum pump. If this is the first time a chromatogram of a given charge is being made, it is recommended that this step be omitted because evacuation of the helium may simultaneously remove low-boiling constituents. The identical material should then be prepared for a second chromatogram and Step (e) included; generally the peaks will be sharper and resolution better. If comparison of the two chromatograms shows that no peaks are missing from the second, Step (e) may safely be included in the preparation procedure.

(f) Valve 12 was turned to "bypass," trap 8 pressurized with helium, and trap 13 connected at a valve on a gas chromatograph feed line.

(g) Trap 8 was removed from the system of FIG. 1, placed in liquid nitrogen, and connected to the end of the sample column of the GLC. Valve 7 was then turned to "through." When the base line was again steady, valve 12 also was turned to "through" and the chromatogram of FIG. 2 was obtained.

(h) Trap 8 containing the pyrolyzate and trap 13 were placed back into system of FIG. 1, less the reaction vessel J, and the process repeated for the chromatogram of FIG. 3. All subsequent chromatograms were made by the same procedure.

Comparison of the chromatograms of FIGS. 2 and 3 shows that reproducibility is excellent. That the first two peaks (at the right of Point A) of FIG. 3 are larger than those of FIG. 2 indicates that some of the components of the pyrolyzate had decomposed and that two of the products of decomposition were of the same material as those indicated by these first two peaks. Since the pyrolyzate was a mixture of hydrofluorocarbons and since the solid support in the column contained a silicate, some decomposition was expected. The rest of the peaks of FIG. 3 were smaller than the corresponding ones of FIG. 2, the amount of decrease varying from peak to peak but always less than 4 percent. Subsequent pyrolyses of different samples of the same polymer yielded practically the same chromatogram. Hence, a new pyrolysis need not be made for each peak to be examined. When 20–25 peaks for several different polymers are involved, this amounts to a considerable saving of time and effort.

The intake peaks are quite sharp, indicating that practically all of the material in concentration trap 13 was in the vapor state at 120° C. when admitted to the GLC. Mixing with the carrier gas is thus minimized, which results in improved peak resolution.

Example 2

The chromatogram of FIG. 4 was obtained by putting the pyrolyzate through the LB–550–X column. Comparison of the chromatograms of FIGS. 2 and 3 with that of FIG. 4 shows that all peaks from the points A up to points B are somewhat similar. However, to the right of B, the chromatograms of FIGS. 2 and 3 are quite different from the chromatogram of FIG. 4; a peak in this region on FIG. 3 would probably be shifted to a different retention time on FIG. 4 thereby revealing any peaks of interest which are found. This separation of adjacent or overlapping peaks will facilitate the collection of individual peaks. Also, individual peaks can be tested for purity.

Example 3

In order to determine if any of the pyrolysis products contained multiple bonds, the pyrolyzate was circulated for two hours through 1 cc. of concentrated sulfuric acid in reaction vessel 11, which was a glass U-tube. During this operation concentration trap 13 was temporarily on "bypass." The material was then collected in trap 13, which was then detached and connected to a GLC. The chromatogram of FIG. 5 was made. Comparison of FIGS. 2 and 5 shows that a major peak (W) of FIG. 1 has disappeared. This peak was subsequently found to be acetone which had remained on the sample holder of the pyrolysis oven after cleaning revealing two smaller peaks (X) on FIG. 5. The considerable decrease in the size of the rest of the peaks, and also the blackened state of the sulfuric acid, indicated that a multiple bond might be present in most of the pyrolysis products. A new peak appeared in FIG. 5 at Y.

Example 4

In order to assess the effectiveness of the apparatus, the chromatogram of FIG. 6 was made without using it. The material of FIG. 5 was caught in trap 8, which immersed in liquid nitrogen at the end of the GLC sample column, and the helium evacuated. Trap 8 was then connected to the GLC through valve 7, the arms flushed with helium from the GLC, and the chromatogram of FIG. 6 made. Next the material from FIG. 6 was caught in trap 8 at the end of the GLC sample column and, this time using trap 13 to concentrate the sample, the chromatogram of FIG. 7 was made. The chromatograms of FIGS. 5 and 7 agreed closely. Any differences between them and the chromatogram of FIG. 6 were solely due to the use of the concentrator.

Up to points C in FIG. 6 (the first 70 minutes), when about 95 percent of the material had eluted, there is no resemblance between FIG. 6 and FIGS. 5 and 7. The chance of trapping any of the pyrolyzate components in a state pure enough for identification, using the equipment and technique which produced FIG. 6, is so remote that it is not worth attempting. However, for the remaining time (about two hours, not all of which is shown) there is quite a strong resemblance. This can be explained by assuming that the factors which cause the peak to broaden are statistically independent and hence their variances are additive. On the basis of this assumption, the equation:

$$N' = N \frac{(V_R^\circ)^2}{N \cdot s_I^2 + (V_R^\circ)^2}$$

can be derived, where N is the true plate-number of the column, $N'$ is the empirical plate-number, $s_I^2$ is the variance of the input distribution, and $V_R^\circ$ is the retention volume.

For FIGS. 5 and 7, the variance of the input distribution was quite small because, when valve 12 was opened, there was apparently very little mixing between the sample and the helium from the GLC in the 0.125-inch O.D. copper tubing, thus a reasonable approximation to "plug" flow resulted. The above equation then reduced to $N'=N$, and optimum resolution, starting with the initial peak, is obtained at fixed GLC operating conditions. There is some tailing at the end of the intake peak. This is due, perhaps either to turbulence or to high-boiling material which was not entirely in the vapor state at 120° C. when trap 13 was opened, or to both of these reasons.

The variance of the input peak of FIG. 6 at Z is obviously quite large, comparatively. This indicated that there was considerable mixing between the carrier gas and the sample when the 0.250-inch O.D. tubing was used. This is to be expected inasmuch as the volume of the sample at the column inlet temperature and pressure was estimated to be about 18 cc., whereas the volume of trap 8 was 140 cc. $N'$ is therefore much less than N and resolution suffers accordingly. It is not until a retention time of one hour is reached that the retention volume becomes large enough for $N'$ to effectively equal N and hence for FIGS. 5, 6 and 7 to become similar.

Example 5

In order to determine if powdered metals affect the decomposition of the powdered, plasticizer-free polyvinylidene fluoride, 4 samples (3.0 gms. each) of the pure, powdered polyvinylidene fluoride were pyrolyzed at 450° C. and chromatograms were made of the more volatile products. The mean and standard deviations of the peak heights of 22 of the large and medium peaks were computed. Then 3 grams of the polymer were thoroughly mixed with 32 gms. of Zn dust and the mixture pyrolyzed at 450° C. Comparison of the chromatogram obtained showed that 10 peaks were greater than the corresponding ones of the pure polymer by six times the standard deviation, and that there was one new peak. Using 40 gms. of Cu dust, six peaks were found to exceed the corresponding ones of the pure polymer by more than 6 times the standard deviation. Hence both Zn and Cu do affect the decomposition of polyvinylidene fluoride and/or pyrolysis products at 450° C.

Other materials, such as Al, $AlF_3$, Fe, and $Cr_2O_3$, were also used. Both Al and $AlF_3$ decreased many of the peak heights by 50%. Iron caused 6 peaks to be over 100% larger and 3 new peaks to appear. When $Cr_2O_3$ was used, the water produced was removed by using vessel 11 containing $CaCl_2$. The resulting chromatogram showed that $Cr_2O_3$ affected the decomposition very strongly; most of the peaks were one tenth their normal size. The new peaks appeared in regions where the peaks on the chromatogram of the pure polymer were quite small. The new peaks as well as those of increased height may be due to the formation of new compounds or simply to the formation of more of those which appear on the chromatogram of the pure polymer. In all of the above cases there were many peaks of normal height. This rules out the presence of a leak or the accidental use of more than 3 gms. of polymer as the cause of the deviations.

An attempt was made to identify the major peaks in the chromatogram of the pure polymer. The largest peak, labelled Bx128 on FIG. 5, amounts to about 25% of the material chromatographed. Its IR spectrum was found to match that of sym-trifluorobenzene identically, and the base and maximum peak of its mass spectrum was at mass 132. Since the low molecular weight materials would be easiest to identify, a major peak with a shoulder occurring near the beginning of the chromatogram obtained using the DDP column was selected for purification and identification. A DC Silicone Oil 200 column broke the peak and its shoulder into 13 peaks. Matching IR or mass spectra for most of these materials could not be found in the literature. Fluoroform, $CH_2=CF_2$, $CF_2$, $CHF$, $CF_2=CHF$ were easily identified from their mass spectra. Some of the other compounds have been tentatively identified from their mass spectra as $CF_2=CH—CF_2H$, $CF_2=CH—CF_3$, $CHF=CH—CF_3$, $CF_2=CF—CF_2H$, $CF_2H—CF_2—CF_3$, $CF_3—CF_2—CH_3$,
$CF_3—CH_2—CF_2—CF_2H$.

What is claimed is:

1. A method for concentrating a volatile material with minimum loss or contamination which comprises:
   collecting the volatile material in a first confined zone,
   passing a pulsating stream of carrier gas through the first confined zone at a temperature at which the volatile material has an appreciable vapor pressure,
   passing the pulsating stream of carrier gas and volatile material into a second confined zone, and
   condensing the volatile material in the second confined zone.

2. The method of claim 1 wherein the volatile material is collected in the first confined zone by condensing it therein.

3. The method of claim 2 wherein the second confined zone is an elongated confined zone.

4. The method of claim 3 wherein uncondensed material is removed from the condensed volatile material in the elongated confined zone.

5. The method of claim 4 wherein the volume of the elongated confined zone is only slightly greater than the volume of the condensed sample.

6. The method of claim 5 wherein the pulsating stream of gas is recycled through the confined zones until substantially all the volatile material has condensed in the elongated, confined zone which has been precooled.

7. The method of claim 6 wherein the pulsating stream of gas and the volatile material are passed through a reaction zone and a volatile reaction product is subsequently condensed in the second confined zone.

8. The method of claim 6 wherein the carrier gas is inert gas.

9. A method for obtaining an improved chromatogram of a volatile material which comprises:
collecting the volatile material in a first confined zone,
passing a pulsating stream of carrier gas through the first confined zone at a temperature at which the volatile material has an appreciable vapor pressure,
passing the pulsating stream of carrier gas and volatile material into a second confined zone,
condensing the volatile material in the second confined zone,
raising the temperature of the volatile material in the second confined zone above the vaporizing temperature of the volatile material, and
passing the vaporized volatile material through means for recording a gas-liquid chromatogram.

10. The method of claim 9 wherein the volatile material is collected in the first confined zone by condensing it therein.

11. The method of claim 10 wherein the second confined zone is an elongated confined zone.

12. The method of claim 11 wherein the volume of the elongated confined zone is only slightly greater than the volume of the condensed sample.

13. The method of claim 12 wherein uncondensed material is removed from the elongated confined zone before the temperature of the volatile material is raised.

14. The method of claim 13 wherein the pulsating stream of gas is recycled through the confined zones until substantially all the volatile material has condensed in the elongated confined zone which has been precooled.

15. The method of claim 14 wherein the means for recording a gas-liquid chromatogram utilizes a non-destructive sensing element.

16. The method of claim 15 wherein the vaporized volatile material is again condensed in a cooled, confined zone subsequent to passage through the means for recording a gas-liquid chromatogram.

17. The method of claim 16 wherein the pulsating stream of gas and the volatile material are passed through a reaction zone and a volatile reaction product is subsequently condensed in the second confined zone.

18. The method of claim 16 wherein the carrier gas is inert gas.

19. An apparatus for concentrating a volatile material with minimum loss or contamination which comprises:
means for passing the volatile material into a first confined zone for collecting said volatile material,
means for retaining the volatile material in the first confined zone,
means for producing a pulsating stream of carrier gas,
means for flushing said volatile material from said first confined zone with said pulsating stream of carrier gas,
means for passing said pulsating stream from said first confined zone into a second confined zone,
means for condensing the volatile material in the second confined zone.

20. An apparatus of claim 19 wherein the second confined zone is an elongated confined zone.

21. An apparatus of claim 20 having means in the elongated confined zone for separating gas from condensed material.

22. An apparatus of claim 21 having means for heating the elongated, confined zone.

23. An apparatus of claim 22 having means for recycling the pulsating stream of carrier gas through the apparatus.

24. An apparatus of claim 23 having means for passing the pulsating stream of gas and the volatile material through a reaction zone prior to condensation in the second confined zone.

25. An apparatus of claim 23 wherein the means for recycling the pulsating stream is means for recycling a pulsating stream of inert gas.

26. An apparatus for obtaining an improved chromatogram of a volatile material which comprises:
means for passing the volatile material into a first confined zone for collecting said volatile material,
means for retaining the volatile material in the first confined zone,
means for producing a pulsating stream of carrier gas,
means for flushing said volatile material from said confined zone with said pulsating stream of carrier gas,
means for passing said pulsating stream from said first confined zone into a second confined zone,
means for cooling the second confined zone,
means for heating the second confined zone, and
means for passing the revaporized volatile material through a gas-liquid chromatograph.

27. An apparatus of claim 26 wherein the second confined zone is an elongated confined zone.

28. An apparatus of claim 27 having means in the elongated confined zone for separating gas from condensed material.

29. An apparatus of claim 28 having means for heating the elongated, confined zone.

30. An apparatus of claim 29 having means for recycling the pulsating stream of carrier gas through the apparatus.

31. An apparatus of claim 30 having means for passing the pulsating stream of gas and the volatile material through a reaction zone prior to condensation in the second confined zone.

32. An apparatus of claim 30 wherein the means for recycling the pulsating stream is means for recycling a pulsating stream of inert gas.

References Cited

UNITED STATES PATENTS

| | | | |
|---|---|---|---|
| 3,173,762 | 3/1965 | Varadi et al. | 73—23.1 X |
| 3,174,326 | 3/1965 | Carle et al. | 73—23.1 |
| 3,234,779 | 2/1966 | Dawson | 73—23.1 |
| 3,366,149 | 1/1968 | Taft et al. | 73—23.1 |

JAMES L. DECESARE, Primary Examiner